(12) United States Patent
Chang et al.

(10) Patent No.: US 11,143,383 B2
(45) Date of Patent: Oct. 12, 2021

(54) LIGHT EMITTING DEVICE WITH LIGHT BLOCKING ELEMENT

(71) Applicants: LITE-ON ELECTRONICS (GUANGZHOU) LIMITED, Guangzhou (CN); LITE-ON TECHNOLOGY CORPORATION, Taipei (TW)

(72) Inventors: Kuo-Hui Chang, Taipei (TW); Yao-Chi Peng, Taipei (TW)

(73) Assignees: LITE-ON ELECTRONICS (GUANGZHOU) LIMITED; LITE-ON TECHNOLOGY CORPORATION

(*) Notice: Subject to any disclaimer, the term of this patent is extended or adjusted under 35 U.S.C. 154(b) by 0 days.

(21) Appl. No.: 17/094,665

(22) Filed: Nov. 10, 2020

(65) Prior Publication Data

US 2021/0207786 A1 Jul. 8, 2021

(30) Foreign Application Priority Data

Jan. 6, 2020 (CN) .......................... 202010009602.9

(51) Int. Cl.
| | |
|---|---|
| *F21V 8/00* | (2006.01) |
| *F21V 7/00* | (2006.01) |
| *F21V 23/04* | (2006.01) |
| *F21Y 115/10* | (2016.01) |
| *F21Y 105/16* | (2016.01) |
| *F21Y 107/50* | (2016.01) |

(52) U.S. Cl.
CPC ........ *F21V 7/0008* (2013.01); *F21V 23/0464* (2013.01); *G02B 6/0036* (2013.01); *G02B 6/0066* (2013.01); *G02B 6/0068* (2013.01); *F21Y 2105/16* (2016.08); *F21Y 2107/50* (2016.08); *F21Y 2115/10* (2016.08)

(58) Field of Classification Search
CPC ....... F21S 8/085; F21S 8/086; F21Y 2105/16; F21Y 2107/50; G02B 6/0066; G02B 6/0068

See application file for complete search history.

(56) References Cited

U.S. PATENT DOCUMENTS

| | | | |
|---|---|---|---|
| 10,508,778 B2* | 12/2019 | Kuriki ........................ | F21K 9/00 |
| 2012/0320588 A1* | 12/2012 | Quilici .................... | F21S 8/046 |
| | | | 362/249.02 |
| 2020/0292151 A1* | 9/2020 | De Samber ............... | F21V 7/05 |

* cited by examiner

*Primary Examiner* — Keith G. Delahoussaye
(74) *Attorney, Agent, or Firm* — Innovation Counsel LLP

(57) ABSTRACT

The present invention discloses a light emitting device. The light emitting device includes a housing, a first light emitting module and a second light emitting module. The first light emitting module is provided with a first light emitting area and is disposed on the housing. The second light emitting module is provided with a second light emitting area and is disposed on the housing and surrounds the first light emitting module. A first luminance in the first light emitting area is higher than a second luminance in the second light emitting area, and the first luminance and the second luminance are separately controlled.

15 Claims, 6 Drawing Sheets

LIGHT EMITTING DEVICE WITH LIGHT BLOCKING ELEMENT

This application claims the benefit of People's Republic of China application Serial No. 202010009602.9, filed on Jan. 6, 2020, the subject matter of which is incorporated herein by reference.

BACKGROUND OF THE INVENTION

Field of the Invention

The invention relates in general to a light emitting device, and more particularly to a light emitting device provided with multiple light emitting modules.

Description of the Related Art

Normally, the light emitting module of the street lamp is hanged on the street lamp pole. When the light emitting module directly illuminates the road surface from a certain height, an illumination area is generated accordingly. Under such circumstance, the light output of the light emitting module has a sudden drop in the non-illumination area. When a passenger enters a non-illumination area from an illumination area and looks at the street lamp, the luminance received by the passenger's eyes will increase drastically and generate glare, which will cause visual discomfort to the passenger. Nowadays, as people's expectation of the visual comfort of the street lamp is getting higher and higher, the visual discomfort caused by glare has become a prominent issue to be resolved. Referring to FIG. 1, a luminance characteristics diagram of an existing street lamp is shown. The horizontal axis represents the light emitting positions on the light emitting surface of the street lamp, and the vertical axis represents the luminance. As indicated in FIG. 1, when a passenger enters an illumination area (corresponding to the surging segments at the two ends of the curve) from a non-illumination area and looks at the lamp surface, the surge in luminance will make the passenger experience glare.

Therefore, how to provide a new light emitting device capable of resolving the glare phenomenon to improve visual comfort has become one of the prominent directions to people in the present technology field.

SUMMARY OF THE INVENTION

The invention is directed to a light emitting device capable of resolving existing problems of the lamps.

According to one embodiment of the present invention, a light emitting device is disclosed. The light emitting device includes a housing, a first light emitting module and a second light emitting module. The first light emitting module is provided with a first light emitting area and is disposed on the housing. The second light emitting module is provided with a second light emitting area and is disposed on the housing and surrounds the first light emitting module. A first luminance in the first light emitting area is higher than a second luminance in the second light emitting area, and the first luminance and the second luminance are separately controlled.

The above and other aspects of the invention will become better understood with regard to the following detailed description of the preferred but non-limiting embodiment (s). The following description is made with reference to the accompanying drawings.

DETAILED DESCRIPTION OF THE INVENTION

Detailed descriptions of the present invention are disclosed below with accompanying drawings and embodiments. However, the descriptions are not for limiting the present invention.

Figure 1:
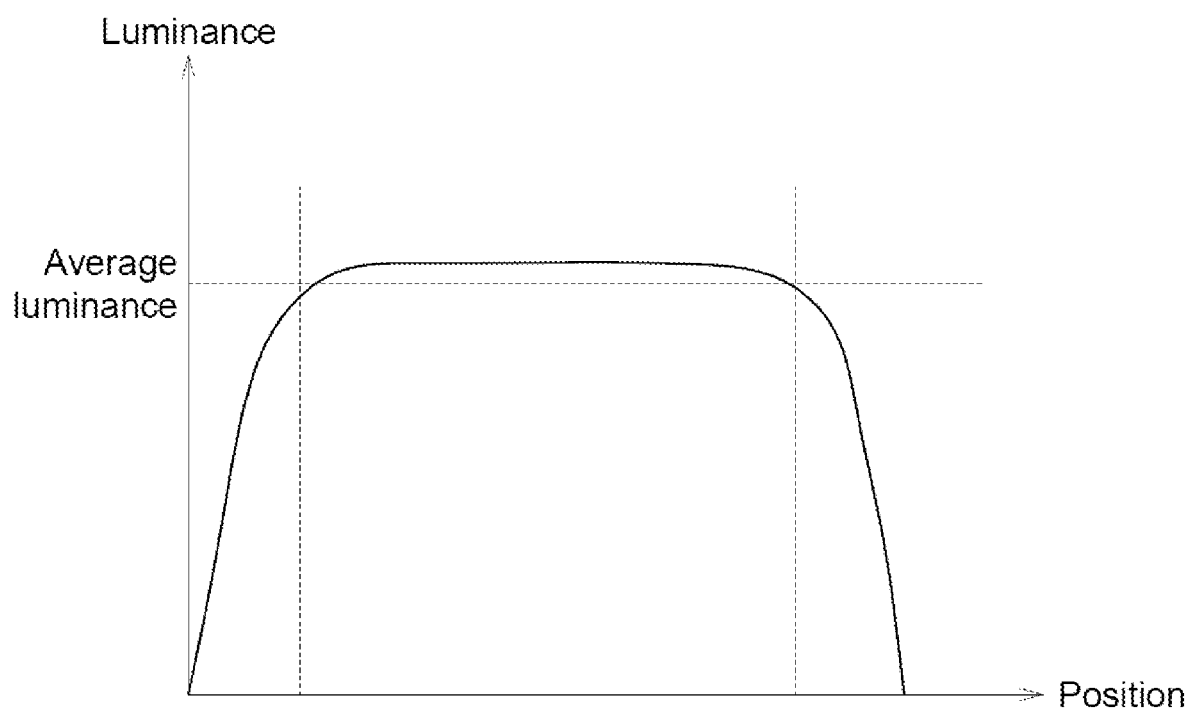
FIG. 1 is a luminance characteristics diagram of an existing street lamp.
Figure 2A:
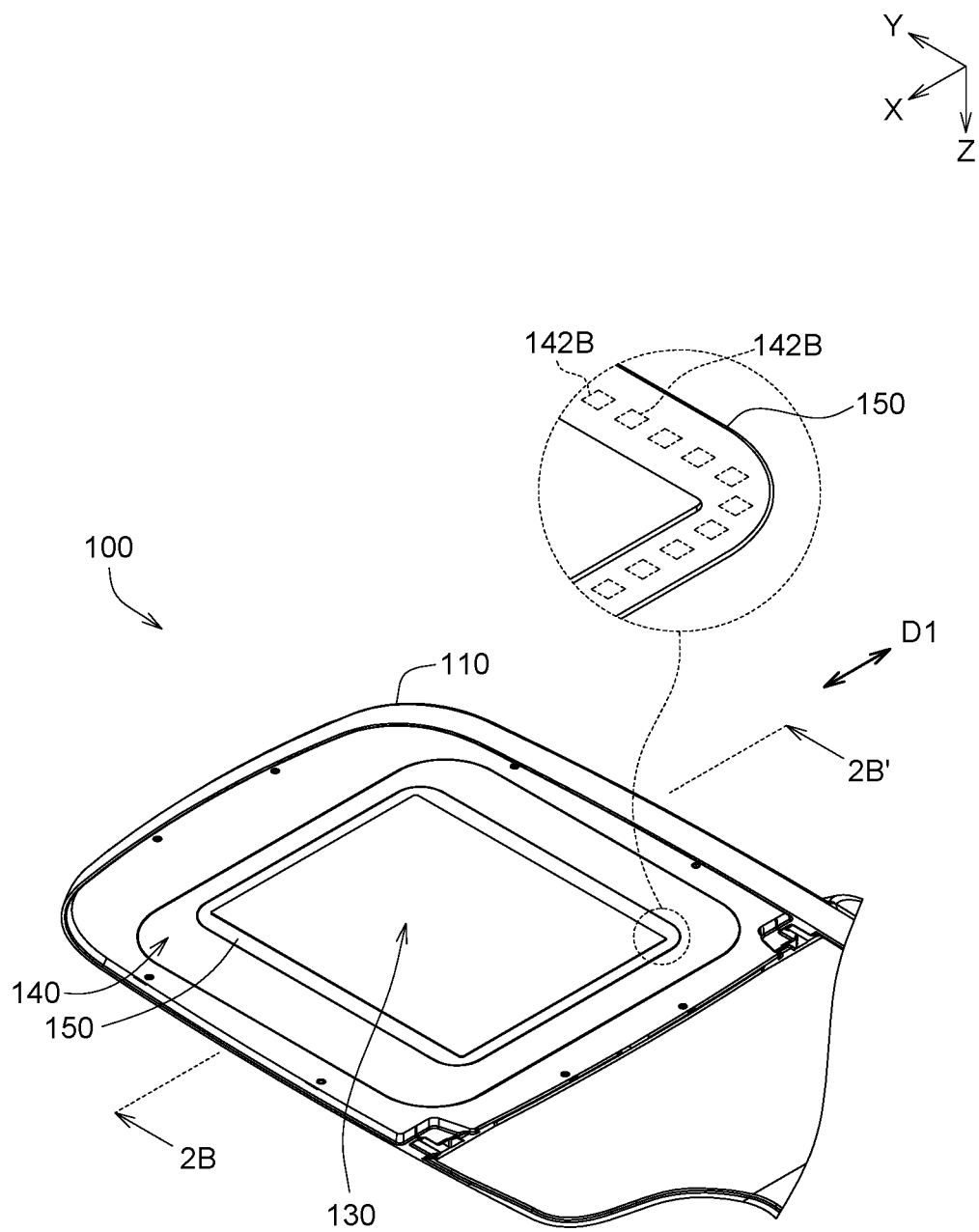
FIG. 2A is a schematic diagram of a light emitting device according to an embodiment of the present invention.
Figure 2B:
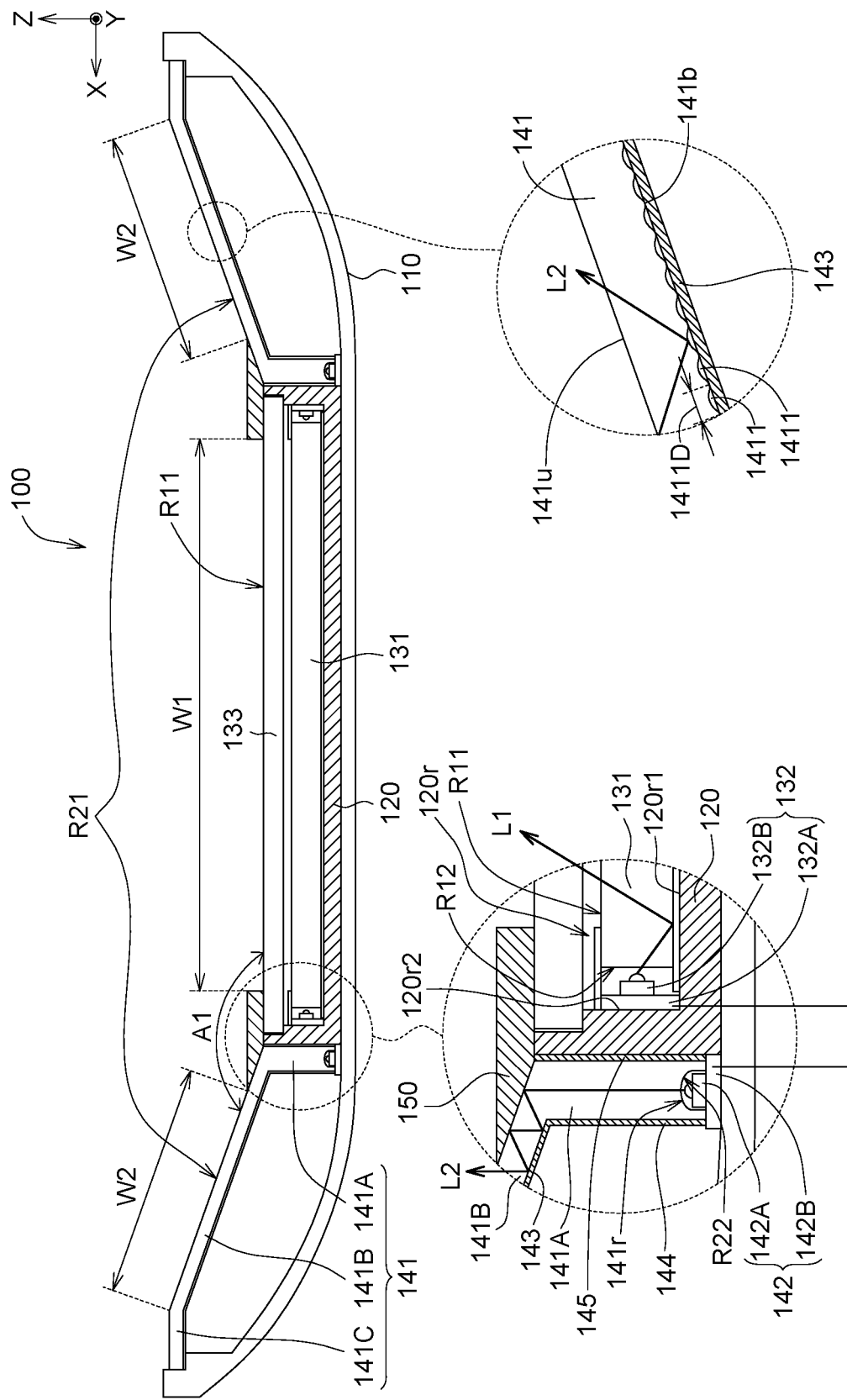
FIG. 2B is a cross-sectional view of the light emitting device of FIG. 2A along a cross-sectional line 2B-2B' (the light emitting area faces upwards).
Figure 2C:
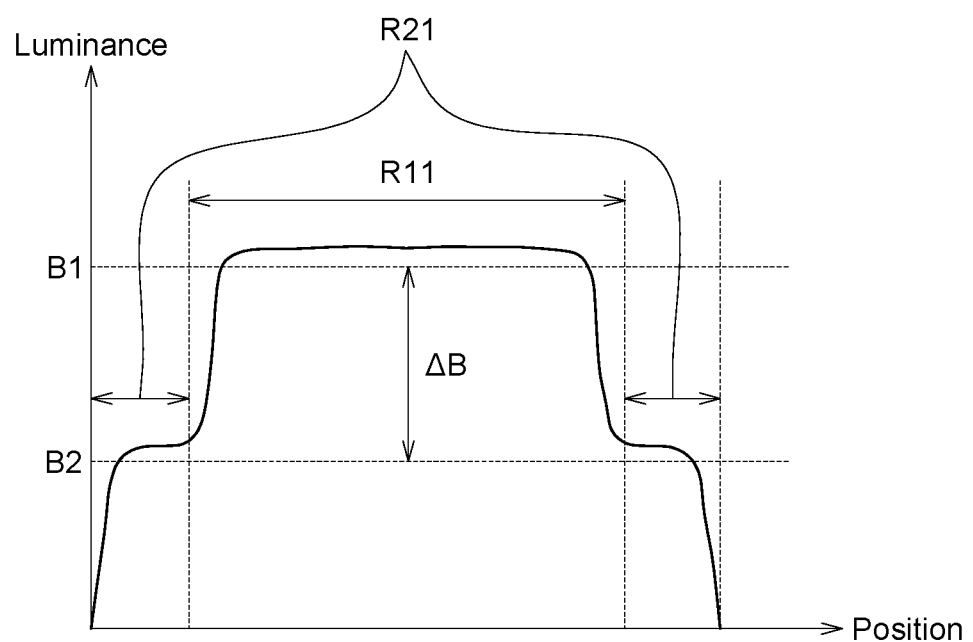
FIG. 2C is a luminance distribution diagram of the light emitting device of FIG. 2A along a direction 2B-2B'.

Refer to FIGS. 2A to 2C. FIG. 2A is a schematic diagram of a light emitting device 100 according to an embodiment of the present invention. FIG. 2B is a cross-sectional view of the light emitting device 100 of FIG. 2A along a cross-sectional line 2B-2B' (the light emitting area faces upwards). FIG. 2C is a luminance distribution diagram of the light emitting device 100 of FIG. 2A along a direction 2B-2B'.

The light emitting device 100 could be realized by a street lamp or other illumination product. As indicated in FIGS. 2A to 2B, the Z-axis direction is substantially perpendicular to the first light emitting area R11, and the XY plane is substantially parallel to the light emitting surface of the first light emitting area R11.

As indicated in FIGS. 2A and 2B, the light emitting device 100 includes a housing 110, a first light emitting module 130, and a second light emitting module 140. The first light emitting module 130 is provided with a first light emitting area R11 and is disposed on the housing 110. The second light emitting module 140 is provided with a second light emitting area R21 and is disposed on the housing 110 and surrounds the first light emitting module 130. In an embodiment, a first luminance B1 in the first light emitting area R11 is higher than a second luminance B2 in the second light emitting area R21, and the first luminance B1 and the second luminance B2 are separately controlled.

As indicated in FIG. 2C, the first luminance B1 is such as an average luminance of the first light L1 emitted by the first light emitting module 130 and outputted via the first light emitting area R11, and the second luminance B2 is such as an average luminance of the second light L2 emitted from the second light emitting module 140 and outputted via the second light emitting area R21. Since the first luminance B1 and the second luminance B2 are separately controlled, through luminance control, the second luminance B2 could generate a visual buffer between the first luminance B1 and the background luminance to reduce or even avoid glare and increase visual comfort.

As indicated in FIG. 2B, the first light emitting area R11 and the second light emitting area R21 are respectively provided with a first width W1 and a second width W2 along a direction D1 (illustrated in FIG. 2A). In an embodiment, the ratio of the second width W2 to the first width W1 is in a range of 0.08 to 0.35. In an embodiment, the direction D1 is such as a short axis direction of the light emitting device 100, a long axis direction of the light emitting device 100, or any direction forming an angle of 0° to 90° (excluding 0° and 90°) with the long axis direction or the short axis direction of the light emitting device 100.

In the present embodiment as indicated in FIG. 2B, the first light emitting area R11 and the second light emitting area R21 are not parallel to each other, that is, an angle A1 other than 0° and 180° is formed between the first light emitting area R11 and the second light emitting area R21. In an embodiment, the angle A1 is in a range of about 120° to 180° (the endpoints of the said range could be included or excluded). In another embodiment, the first light emitting area R11 and the second light emitting area R21 could be parallel to each other. For example, the first light emitting area R11 and the second light emitting area R21 are substantially coplanar; or, the first light emitting area R11 and the second light emitting area R21 are parallel to each other but are separated by a distance along the Z-axis direction.

The housing 110 could be realized by an opaque housing lest the light might leak through the housing 110. Preferably, the housing is formed of a metal (such as aluminum, copper, stainless steel or other metal materials) or a resin with high thermal conductivity (such as glass fiber reinforced plastic). The materials possess both features of high strength and high thermal conductivity. Additionally, heat sinks could be disposed on an outer surface of the housing 110 to further increase the effect of heat dissipation.

As indicated in FIG. 2B, the first light emitting module 130 includes a base 120.

The material of the base 120 could be the same with that of the housing 110. Preferably, the base 120 is formed of a metal or a resin with high thermal conductivity, such that the base 120 possesses both features of high strength and high thermal conductivity. The base 120 could be realized by an opaque base, such that the first light L1 emitted from the first light emitting module 130 will not enter the second light emitting module 140 before the first light L1 is outputted via the first light emitting area R11 and the second light L2 emitted from the second light emitting module 140 will not enter the first light emitting module 130 before the second light L2 is outputted via the second light emitting area R21. Thus, the first light L1 emitted from the first light emitting module 130 and the second light L2 emitted from the second light emitting module 140 will not interfere with each other in the light emitting device 100, and the performance of luminance could be more precisely controlled in the first light emitting area R11 and the second light emitting area R21 respectively.

As indicated in FIG. 2B, the first light emitting module 130 further includes a first light guide element 131 and a first light emitting element 132. In the present embodiment, the first light guide element 131 and the first light emitting element 132 both are disposed in the base 120. As indicated in FIG. 2B, the base 120 is provided with a groove 120r, and the first light guide element 131 is disposed on the bottom 120r1 of the groove 120r and is provided with the said first light emitting area R11 and a first light incident area R12. The first light emitting element 132 corresponds to the first light emitting area R11 of the first light guide element 131. The first light emitting element 132 includes at least one circuit board 132A and at least one light source 132B, wherein the light source 132B, such as an LED package, is electrically connected to the circuit board 132A. In the present invention, relative relation between the first light emitting element 132 and the first light guide element 131 could be adjusted according to the user's needs. For example, the first light emitting element 132 is adjacent to the first light incident area R12, such that the first light L1 emitted from the light source 132B could enter the first light incident area R12 and then is guided by the first light guide element 131 to be outputted via the first light emitting area R11. As indicated in FIG. 2B, the first light incident area R12 is a lateral side of the first light guide element 131, and the first light emitting element 132 is a forward light source. Meanwhile, the circuit board 132A is fixed on a side wall of the groove 120r, such that the first light L1 emitted from the light source 132B could forwardly enter the first light incident area R12. In an unillustrated embodiment, the first light emitting element 132 is a side light source; meanwhile, the circuit board 132A could be disposed at the bottom of the groove 120r, such that the first light L1 emitted from the light source 132B could enter the first light incident area R12 from the side. In some embodiments, a reflective layer is further disposed under the first light guide element 131 to increase the light output effect.

In the present embodiment the base 120 is directly disposed on an inner surface of the housing 110. However, in some unillustrated embodiments, the base 120 could be disposed on an inner surface of the housing 110 through a stand-off column. In some other unillustrated embodiments, the base 120 and the housing 110 could be integrally formed in one piece, and the said modifications are still within the scope of protection of the present invention.

As indicated in FIG. 2B, the first light emitting module 130 further includes a transparent cover 133 disposed on the base 120. The transparent cover 133 covers and protects the first light guide element 131 and the first light emitting element 132 and prevents the light emitting device 100 from being infiltrated by external impurities such as liquids or dusts. Although the transparent cover 133 of FIG. 2B is exemplified by a transparent plate, the present invention is not limited thereto. In other unillustrated embodiments, the transparent cover 132 could be realized by a lens or a curved plate.

In an embodiment as indicated in FIG. 2B, the second light emitting module 140 includes a second light guide element 141 and at least one second light emitting element 142.

The second light guide element 141 is provided with the said second light emitting area R21 and a second light incident area R22. The second light emitting element 142 is adjacent to the second light incident area R22. In an embodiment, the second light incident area R22 is provided with a recess or is in the shape of a recess, in which the second light emitting element 142 is received. In another embodiment, the second light incident area R22 could be a plane. In the present invention, the geometric structure of the second light incident area R22 is not subjected to specific restrictions, and any geometric structure allowing the light to enter the second light guide element 141 would do.

As indicated in FIG. 2B, the second light emitting element 142 includes at least one circuit board 142A and at least one light source 142B, wherein the light source 142B, such as LED package, is electrically connected to the circuit board 142A. The second light L2 emitted by the light source 142B could enter the second light incident area R22 of the second light guide element 141 and then is guided by the second light guide element 141 to be outputted via the second light emitting area R21. As indicated in FIG. 2B, the second light emitting element 142 is disposed on the housing 110. For example, the second light emitting element 142 is in direct contact with the housing 110, therefore the heat generated by the second light emitting element 142 could be quickly dissipated to the external environment through the housing 110. However, the present invention is not limited thereto, and the user could change the position of the second light emitting element 142 according to actual needs.

As indicated in FIG. 2B, the second light guide element 141 illustratively includes a first portion 141A, a second portion 141B and a third portion 141C, wherein the second portion 141B connects the first portion 141A and the third portion 141C. The second light incident area R22 is located on the first portion 141A, and the second light emitting area R21 is located on the second portion 141B. The third portion 141C leans on the housing 110 to increase the stability between the second light guide element 141 and the housing 110.

More specifically, the first portion 141A is adjacent to the first light emitting module 130 and is extended from the second light emitting element 142 along a direction substantially parallel to a side wall 120r2 of the base 120. The second portion 141B and the third portion 141C are laterally extended in a direction away from the first light emitting module 130. The second portion 141B is obliquely (outwardly) extended form the first portion 141A in a direction away from the first light emitting module 130. The third portion 141C is horizontally extended to the housing 110 from the second portion 141B in a direction away from the first light emitting module 130 and leans on the housing 110. The third portion 141C could leans on or is fixed on the housing 110 to increase the stability between the second light guide element 141 and the housing 110.

As indicated in FIG. 2A, a plurality of light sources 142B of the second light emitting module 140 surround the first light emitting module 130, such that the light emitting device 100 could provide an omni-directional (360°) anti-glare function. Besides, one or some of the light sources 142B or another or some other of the light sources 142B are separately controlled to control or adjust the light shape, illumination range, color temperature and/or luminance of the second light L2 emitted from the second light emitting area R21.

As indicated in FIG. 2B, the second light guide element 141 is provided with a light output surface 141u and a bottom surface 141b opposite to the light output surface 141u. The bottom surface 141b is provided with a plurality of fine structures 1411, such as cavities recessed towards the second light emitting area R21 from the bottom surface 141b. The fine structures 1411 could break the total reflection of the light, such that the second light L2 transmitted in the second light guide element 141 through total reflection could be outputted via the second light emitting area R21. Each of the fine structure 1411 has a diameter 1411D which is getting larger along a direction away from the second light emitting element 142. For example, the fine structure 1411 which is away from the second light emitting element 142 has the diameter 1411D larger than that of the fine structure 1411 which is closer to the second light emitting element 142. Thus, the luminance of the second light L2 in the second light guide element 141 farther away from the second light emitting element 142 is increased, and the luminance of the light outputted via each part of the second light emitting area R21 becomes more uniform. Similarly, if the distribution density of the fine structures 1411 increase in a direction away from the second light emitting element 142, the luminance of the second light L2 in the second light guide element 141 farther away from the second light emitting element 142 is also increased, and the luminance of the light outputted via each part of the second light emitting area R21 also become more uniform. In another embodiment, the diameter 1411D of each of the fine structures 1411 is substantially identical; or, the distribution density of the fine structures 1411 is substantially identical. In other embodiments, the second light guide element 141 could omit the fine structures 1411. In terms of the manufacturing process, the fine structures 1411 could be formed by way of laser or etching. In another embodiment, the fine structures 1411 and the second light guide element 141 could be integrally formed in one piece using a plastic injection molding process. In an embodiment, the light output surface 141u, the bottom surface 141b and the fine structures 1411 are located at the second portion 141B of the second light guide element 141. However, the said exemplification is not for limiting the scope of the present invention.

In an embodiment, the second light emitting module 140 further includes a first reflective layer 143, a second reflective layer 144 and a third reflective layer 145. The first reflective layer 143 is disposed on the bottom surface 141b of the second light guide element 141. The second reflective layer 144 and the third reflective layer 145 are disposed on the first portion 141A. For example, the first portion 141A is provided with two opposite sides on which the second reflective layer 144 and the third reflective layer 145 are respectively disposed. Moreover, the first reflective layer 143 and the second reflective layer 144 are interconnected, and the second light L2 will not leak through because no gap is formed between the first reflective layer 143 and the second reflective layer 144. Moreover, the second reflective layer 144 and the third reflective layer 145 are extended along the direction of the second light guide element 141. For example, the second light guide element 141 annularly surrounds the first light emitting module 130 in a closed manner, and like the second light guide element 141, the second reflective layer 144 and the third reflective layer 145 also annularly surround the first light emitting module 130 in a closed manner. As a result, the second reflective layer 144 could reflect the second light L2 of the second light emitting module 140 to the second light guide element 141 in an omni-directional manner (360°), and the third reflective layer 145 could reflect the second light L2 of the second light emitting module 140 to the second light guide element 141 in an omni-directional manner (360°). In another embodiment, depending on the acceptable amount of light leakage, the second light emitting module 140 also could omit at least one of the first reflective layer 143, the second reflective layer 144 and the third reflective layer 145.

As indicated in FIG. 2B, the light emitting device 100 further includes a light blocking element 150 interposed between the first light emitting module 130 and the second light emitting module 140. For example, the light blocking element 150 crosses the first light emitting module 130 and the second light emitting module 140 and covers the edge of the first light emitting module 130 and the edge of the second light emitting module 140. Since the light blocking element 150 faces the light emitting surface of the light source 142B of the second light emitting element 142, the second light emitting element 142 is shielded and will not be exposed outside.

As indicated in FIG. 2B, the shielding range of the light blocking element 150 includes the first portion 141A and a part of the second portion 141B (the area outside the second width W2 of FIG. 2B) of the second light guide element 141. The shielding range prevents the second light L2 from leaking via the first portion 141A and the part of the second portion 141B and reflects the second light L2 to the second light guide element 141, such that the second light L2 could be smoothly outputted via the second light emitting area R21 (the area defined by the second width W2 of FIG. 2B). In another embodiment not illustrated in the diagram, the light blocking element 150 could be divided into a first light blocking portion and a second light blocking portion, the first light blocking portion is located above the first light emitting module 130 of the first light emitting area R11, and the second light blocking portion is located above the second light emitting module 140 of the second light emitting area R21, wherein the second light blocking portion prevents the second light L2 from leaking via the part of the second portion 141B (the area outside the second width W2 of FIG. 2B).

Furthermore, the light blocking element 150 could be disposed on the edge of the first light emitting module 132 and surrounds the first light emitting area R11. As indicated in FIGS. 2A and 2B, the light blocking element 150 is in the shape of a closed ring and the area surrounded by the light blocking element 150 is defined as the first light emitting area R11; the second light emitting area R21 ranges from the boundary of the light blocking element 150, and the area of the second portion 141B not covered by the light blocking element 150 is defined as the second light emitting area R21.

As indicated in FIG. 2B, the light emitting device 100 further includes a controller 160 disposed in the light emitting device 100. The controller 160 is electrically connected to the circuit board 132A of the first light emitting element 132 to control the light emitting mode of the light source 132B through the circuit board 132A and is electrically connected to the circuit board 142A of the second light emitting element 142 to control the light emitting mode of the light source 142B through the circuit board 142A.

Figure 3A:
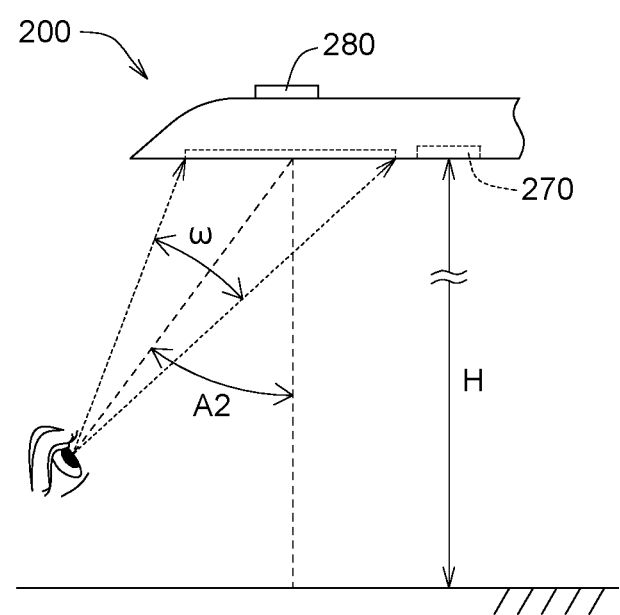
FIG. 3A is a schematic diagram of the light emitting device of FIG. 2A.
Figure 3B:
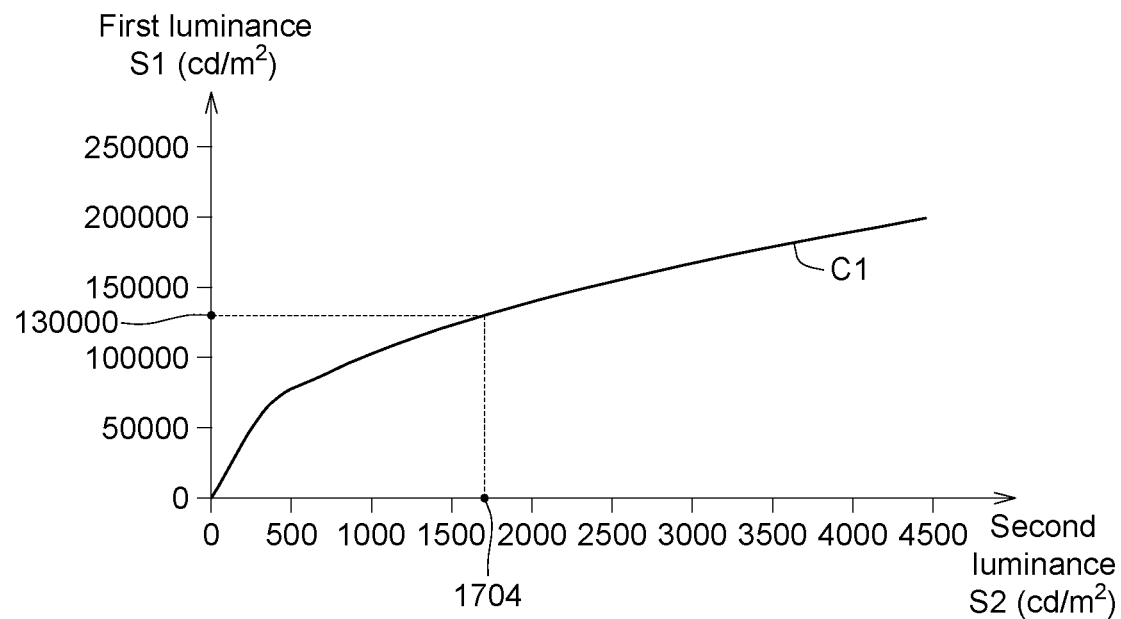
FIG. 3B is a relation diagram of a first luminance in a first light emitting area vs a second luminance in a second light emitting area of the light emitting device of FIG. 3A at a specific distance.
Figure 3C:
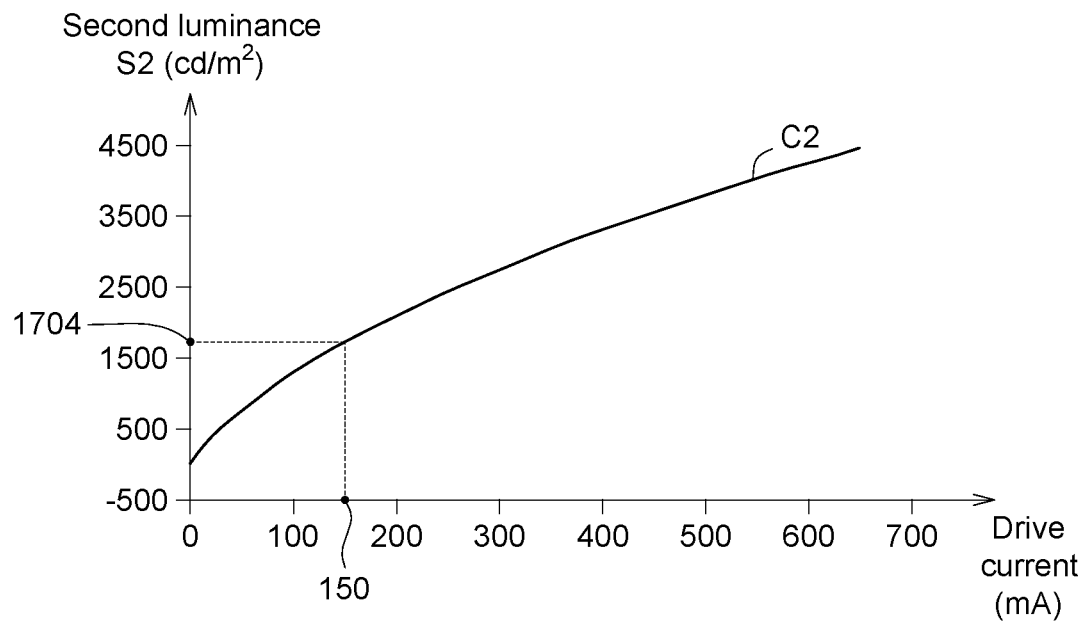
FIG. 3C is a relation diagram of a second luminance in a second light emitting area vs a drive current of the light emitting device of FIG. 3A.

Refer to FIGS. 3A to 3C. FIG. 3A is a schematic diagram of the light emitting device 200 of FIG. 2A. FIG. 3B is a relation diagram of a first luminance in a first light emitting area vs a second luminance in a second light emitting area of the light emitting device 200 of FIG. 3A at a specific distance. FIG. 3C is a relation diagram of a second luminance in a second light emitting area vs a drive current of the light emitting device 200 of FIG. 3A.

The light emitting device 200 includes a housing 110 (not illustrated), a base 120 (not illustrated), a first light emitting module 130 (not illustrated), a second light emitting module 140 (not illustrated), a light blocking element 150 (not illustrated), a controller 160 (not illustrated), a distance sensor 270 and a ambient sensor 280. Technical features of the light emitting device 200 are similar or identical to that of the light emitting device 100 except that the light emitting device 200 further includes a distance sensor 270 and an ambient sensor 280.

The distance sensor 270 could detect a distance H between the light emitting device 200 and the ground G. The distance sensor 270 could be realized by an image sensor, a laser rangefinder or other sensor capable of sensing the distance of a target. The ambient sensor 280 could sense an ambient information. The ambient sensor 280 could be realized by a mist sensor, a raindrop sensor, a humidity sensor or other sensor capable of sense ambient physical information.

As indicated in FIG. 3A, when the human eyes straightly look at the light emitting device 200, the angle A2 is defined by the connection line between the human eye and the light emitting device 200 and a height direction of the light emitting device 200 (such as a direction perpendicular to the ground). The curve C1 of FIG. 3B represents the relation between a first luminance in the first light emitting area R11 and a second luminance in the second light emitting area R21 given that the distance H (such as along the height direction of the light emitting device 200) is 6 meters and the angle A2 is 70°, wherein the luminance is represented in the unit of candela per square meter (cd/m$^2$). The curve C1 of FIG. 3B could be expressed as formula (1). In formula (1), S1 represents a first luminance in the first light emitting area R11, S2 represents a second luminance in the second light emitting area R21, and the solid angle ω covers the first light emitting area R11 (not marked in FIG. 3A) and the second light emitting area R21 (not marked in FIG. 3A) straightly looked at by the human eyes at angle A2 (the first light emitting area R11 and the second light emitting area R21 are included in the coverage of the solid angle ω as indicated in FIG. 3A). Formula (1) is the critical condition between visual comfort and visual discomfort when the human eyes are straightly looking at the lamp. Specifically, given that the first luminance in the first light emitting area R11 is S1 and the solid angle is ω, the corresponding value of the second luminance S2 in the second light emitting area R21 could be obtained according to the curve C1 or formula (1). In terms of control, preferably the controller 160 controls the value of the second luminance of the light emitted to the second light emitting area R21 from the second light emitting module 140 to be at least S2, such that glare could be avoided and visual comfort could be provided.

$$S1 = 108 \times (S2^{0.44}) \times [(\omega^{-0.21}) - 1.28] \tag{1}$$

As indicated in FIG. 3B, given that the distance H is 6 meters and the angle A2 is 70°, when the controller 160 controls the first luminance S1 in the first light emitting area R11 to be 130000 cd/m$^2$, the corresponding second luminance S2 obtained by the controller 160 according to the curve C1 is preferably 1704 cd/m$^2$. When the second luminance S2 is 1704 cd/m$^2$, glare could be avoided, and visual comfort could be further improved.

The curve C2 of FIG. 3C represents a relation between the second luminance in the second light emitting area R21 and the drive current. Given that the value of S2 is known, the drive current required for controlling the second luminance in the second light emitting area R21 to be the value of S2 could be obtained by the controller 160 according to the curve C2. As indicated in the curve C2 of FIG. 3C, when the controller 160 wants to control the second luminance S2 in the second light emitting area R21 to be 1704 cd/m$^2$, the controller 160 could obtain according to the curve C2 that the second light emitting module 140 requires a drive current of 150 mA.

Moreover, different values of the distance H correspond to different trends of the curve C1. The controller 160 is electrically connected to the distance sensor 270 configured to obtain the value of the distance H according to the signal of the distance sensor 270, to obtain the curve C1 of a corresponding trend according to the value of the distance H, and to obtain the value of the second luminance S2 according to the curve C1 of the corresponding trend. However, the value of the distance H could also be a fixed predetermined value.

Furthermore, the controller 160 is electrically connected to the ambient sensor 280 and configured to determine the ambient state according to the ambient information sensed by the ambient sensor 280 and to proactively adjust the drive current and/or the color temperature of the first luminance and/or the second luminance according to the ambient state. Based on the ambient information sensed by the ambient sensor 280, the controller 160 detects that the environment is fogging. In the fogging environment, the light with lower color temperature could penetrate farther than the light with higher color temperature, the color temperature of the first light L1 and/or the color temperature of the second light L2 could be reduced to a predetermined first color temperature value and/or a predetermined second color temperature value, respectively, wherein the predetermined first color temperature value and the predetermined second color temperature value could be identical or different. In an embodiment, the predetermined first color temperature value and/or the predetermined second color temperature value could be in a range of 2000K to 3500K, such as 2500K or 3000K.

In another embodiment, when the controller 160 detects that there are no people or traffic according to the ambient information sensed by the ambient sensor 280, the drive current of the first luminance and/or the drive current of the second luminance could be reduced to save power consumption. For example, the controller 160 reduces the drive current of the first luminance by half and turns off the drive current of the second luminance.

To summarize, the light emitting device of the present invention includes a first light emitting module and a second light emitting module surrounding the first light emitting module, wherein the first light emitting module is provided with a first light emitting area, and the second light emitting module is provided with a second light emitting area. The luminance in the first light emitting area and the luminance in the second light emitting area could be separately controlled to adjust the luminance difference between the two light emitting areas, such that glare could be avoided and visual comfort could be improved. In an embodiment, the light emitting device could adjust the light emitting mode and/or the control mode (such as luminance, color temperature, and drive current) of the first light emitting module and/or the second light emitting module according to the change in the ambient state.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light emitting device, comprises:
   a housing;
   a first light emitting module provided with a first light emitting area and disposed on the housing; and
   a second light emitting module provided with a second light emitting area, wherein the second light emitting module is disposed on the housing and surrounds the first light emitting module;
   wherein a first luminance of the first light emitting area is higher than a second luminance of the second light emitting area, and the first luminance and the second luminance are separately controlled;
   wherein the second light emitting module annularly surrounds the first light emitting module in a closed manner; and
   wherein the second light emitting module continuously surrounds the first light emitting module.

2. The light emitting device according to claim 1, wherein the first light emitting module comprises:
   a first light guide element provided with the first light emitting area and a first light incident area; and
   a first light emitting element disposed adjacent to the first light incident area.

3. The light emitting device according to claim 2, wherein the first light emitting module is disposed corresponding to the first light incident area and comprises a base provided with a groove, in which the first light guide element is disposed.

4. The light emitting device according to claim 1, wherein the second light emitting module comprises:
   a second light guide element provided with the second light emitting area and a second light incident area; and
   a second light emitting element disposed adjacent to the second light incident area;
   wherein the second light guide element is provided with a recess in which the second light emitting element is disposed.

5. The light emitting device according to claim 4, wherein the second light guide element comprises a first portion and a second portion connected to the first portion, the second light incident area is located on the first portion, and the second light emitting area is located on the second portion.

6. The light emitting device according to claim 1, wherein the second light guide element comprises a first portion, a second portion and a third portion, the second portion connects the first portion and the third portion, and the third portion is disposed on the housing.

7. The light emitting device according to claim 4, wherein the second light guide element is provided with a light output surface and a bottom surface opposite to the light output surface, and the second light emitting module further comprises:
   a first reflective layer disposed on the bottom surface.

8. The light emitting device according to claim 7, wherein the second light emitting module further comprises a second reflective layer and a third reflective layer respectively disposed on two opposite sides of the first portion.

9. The light emitting device according to claim 1, wherein the light emitting device further comprises:
   a light blocking element interposed between the first light emitting module and the second light emitting module and opposite to a light emitting surface of the second light emitting element.

10. The light emitting device according to claim 1, wherein the first light emitting area and the second light emitting area are respectively provided with a first width and a second width along a direction, and the ratio of the second width to the first width is in a range of 0.08 to 0.35.

11. The light emitting device according to claim 1, wherein an angle in a range of 120° to 180° is formed between the first light emitting area and the second light emitting area.

12. The light emitting device according to claim 1, wherein the second light emitting module further comprises:
   a plurality of second light emitting elements surrounding the first light emitting module.

13. The light emitting device according to claim 12, wherein one or some of the second light emitting elements and another or some other of the second light emitting elements are separately controlled.

14. The light emitting device according to claim 1, wherein the color temperature of the first light emitting module and the color temperature of the second light emitting module are separately controlled.

15. The light emitting device according to claim 1, wherein the light emitting device further comprises:
   an ambient sensor configured to sense an ambient information; and a controller configured to adjust the light emitting mode in which the first light emitting area emits a light and the light emitting mode in which the second light emitting area emits a light according to the ambient information.

\* \* \* \* \*